US010556246B2

(12) United States Patent
Shimada et al.

(10) Patent No.: US 10,556,246 B2
(45) Date of Patent: Feb. 11, 2020

(54) LIQUID EJECTING DEVICE AND METHOD OF LIQUID EJECTION

(71) Applicant: FUJISAKI ELECTRIC CO., LTD., Tokushima (JP)

(72) Inventors: Tomohisa Shimada, Komatsushima (JP); Sadaki Takai, Anan (JP)

(73) Assignee: GF CORPORATION, Tokushima (JP)

( * ) Notice: Subject to any disclaimer, the term of this patent is extended or adjusted under 35 U.S.C. 154(b) by 136 days.

(21) Appl. No.: 14/388,446

(22) PCT Filed: Mar. 23, 2013

(86) PCT No.: PCT/JP2013/058449
§ 371 (c)(1),
(2) Date: Sep. 26, 2014

(87) PCT Pub. No.: WO2013/146624
PCT Pub. Date: Oct. 3, 2013

(65) Prior Publication Data

US 2015/0048175 A1 Feb. 19, 2015

(30) Foreign Application Priority Data

Mar. 28, 2012 (JP) ................................ 2012-074616

(51) Int. Cl.
*B05B 7/08* (2006.01)
*B05B 1/02* (2006.01)
(Continued)

(52) U.S. Cl.
CPC ............... *B05B 7/0861* (2013.01); *B01J 2/04* (2013.01); *B05B 1/02* (2013.01); *B05B 1/044* (2013.01); *B05B 7/067* (2013.01); *B05B 7/068* (2013.01)

(58) Field of Classification Search
CPC .. B05B 7/67; B05B 1/02; B05B 1/044; B05B 7/0861; B05B 7/06; B01J 2/04
(Continued)

(56) References Cited

U.S. PATENT DOCUMENTS 3,059,613 A * 10/1962 Nakaya .................... B05B 5/03 118/624
3,232,540 A * 2/1966 Cassanmagnago ... B05B 7/1272 239/335
(Continued)

FOREIGN PATENT DOCUMENTS

EP 1 655 077 5/2006
EP 1 793 165 6/2007
(Continued)

OTHER PUBLICATIONS

Extended European Search Report dated Nov. 23, 2015 in corresponding European patent application No. 13769332.1.
(Continued)

*Primary Examiner* — Arthur O. Hall
*Assistant Examiner* — Steven M Cernoch
(74) *Attorney, Agent, or Firm* — Wenderoth, Lind & Ponack, L.L.P.

(57) ABSTRACT

The liquid ejecting device uses pressurized gas to eject liquid as a spray of fine particles and is provided with internal gas-flow passageway to supply pressurized gas, and a nozzle section with a slit-shaped liquid ejecting opening to discharge liquid. The nozzle section is near the end of the an elongated main unit of the liquid ejecting device, and gas jet openings to discharge pressurized gas are established between inclined nozzle surfaces and sidewalls of the main unit. The liquid ejecting opening is connected with liquid-flow passageway and the gas jet openings are connected with the gas-flow passageway. Viewed in cross-section, the
(Continued)

inclined nozzle surfaces are formed such that their extensions intersect above the liquid ejecting opening on a line extending from the liquid ejecting opening, and pressurized gas is discharged as jets along the inclined nozzle surfaces to intersect in a manner that sandwiches the liquid in between and breaks-up the liquid-flow to produce a spray of fine particles.

17 Claims, 12 Drawing Sheets

(51) Int. Cl.
*B01J 2/04* (2006.01)
*B05B 1/04* (2006.01)
*B05B 7/06* (2006.01)

(58) Field of Classification Search
USPC ...................................................... 239/8, 418
See application file for complete search history.

(56) References Cited

U.S. PATENT DOCUMENTS

| | | | | | |
|---|---|---|---|---|---|
| 3,346,412 | A * | 10/1967 | Siegenthaler | B05B 7/08 | 118/315 |
| 3,484,048 | A * | 12/1969 | Mobius | B21C 47/26 | 239/424 |
| 3,805,869 | A * | 4/1974 | Winter | B29B 9/00 | 159/4.01 |
| 4,171,777 | A | 10/1979 | Behr | | |
| 5,427,317 | A * | 6/1995 | Huttlin | B05B 7/025 | 239/422 |
| 5,845,846 | A | 12/1998 | Watanabe et al. | | |
| 5,884,846 | A * | 3/1999 | Tan | B05B 7/066 | 128/200.21 |
| 6,267,301 | B1 | 7/2001 | Haruch | | |
| 6,273,344 | B1 * | 8/2001 | Liu | H01L 21/6708 | 239/418 |
| 6,311,899 | B1 * | 11/2001 | Hidaka | B05B 7/0861 | 239/290 |
| 6,517,010 | B1 * | 2/2003 | Barykin | C23C 4/126 | 239/398 |
| 7,114,662 | B1 * | 10/2006 | Nikkanen | B05B 7/0807 | 239/14.2 |
| 7,506,822 | B2 * | 3/2009 | Cairo | B05B 7/0433 | 239/1 |
| 8,783,585 | B2 * | 7/2014 | Steinhaus | C10J 3/506 | 239/419 |
| 2004/0140374 | A1 * | 7/2004 | Snyder | B05B 7/0416 | 239/418 |
| 2005/0109861 | A1 * | 5/2005 | Chen | B01J 4/002 | 239/423 |
| 2010/0224665 | A1 * | 9/2010 | Vinnay | B05B 7/08 | 226/102 |
| 2010/0224703 | A1 * | 9/2010 | Kwok | B05B 7/0815 | 239/548 |
| 2014/0110504 | A1 * | 4/2014 | Honeyands | B05B 7/10 | 239/418 |

FOREIGN PATENT DOCUMENTS

| | | |
|---|---|---|
| FR | 2 380 074 | 9/1978 |
| JP | 62-12438 | 1/1987 |
| JP | 2797080 | 9/1998 |
| JP | 2001-276678 | 10/2001 |
| WO | 95/06522 | 3/1995 |

OTHER PUBLICATIONS

International Search Report dated Jun. 11, 2013 in International Application No. PCT/JP2013/058449.
Office Action dated Oct. 4, 2016 in corresponding Japanese patent application No. 2014-507842 (with machine translation).
Official Communication pursuant to Article 94(3) EPC dated Nov. 30, 2016 in corresponding European patent application No. 13769332.1-1760.
Official Communication pursuant to Article 94(3) EPC dated Sep. 18, 2017 in corresponding European patent application No. 13769332.1-1762.

* cited by examiner

LIQUID EJECTING DEVICE AND METHOD OF LIQUID EJECTION

BACKGROUND OF THE INVENTION

1. Field of the Invention

The present invention relates to a liquid ejecting device that discharges liquid in the form of fine particles, and to the method of ejecting liquid in the form of fine particles.

2. Description of the Related Art

Nozzles that convert liquid into fine particles are used in various applications. For example, spray-drying methods use nozzles to atomize liquid (e.g. water) that includes solids such as additive agents suspended as micro-particles. The atomized liquid is instantaneously dried in a blast of heat producing solid material.

With these types of applications in mind, the present applicant developed a nozzle 80 to eject liquid as fine particles (see Japanese Patent No. 2797080). As shown in the cross-section of FIG. 14, liquid is supplied to an inclined surface 87 from a supply orifice 85. Liquid supplied to an inclined surface 87 is spread into a thin-film flow 88 by high-speed air that flows along the inclined surface 87. The thin-film flow 88 is accelerated by the air flow and ejected into the ambient (gas) from the upper end of the inclined surface 87 forming micro-droplets 89 of the liquid. With this nozzle 80, liquid can be ejected in the form of extremely small particles.

However, since liquid discharged to the ambient from this type of nozzle 80 results from air flow breaking-up a thin-film flow 88 after it is has been spread-out along an inclined surface 87, it has the drawback that ejected particle size becomes non-uniform when the thickness of the thin-film flow is not constant. Specifically, the probability of the thin-film flow thickness becoming non-uniform increases with the flow length along the inclined surface and with the width of that flow. As the thin-film flow becomes thicker, the size of the particles sprayed-off from the thin-film becomes larger. Accordingly, a non-uniform thin-film flow yields particles of non-uniform diameter, and this has the undesirable effect of requiring additional processing such as a step to sort by particle diameter.

In addition, since the method described above streams high-speed air along a smooth surface to spread-out the supplied liquid, it is necessary to consistently expose the inclined surface to the flow of compressed air. Consequently, this method has the drawback that the inclined surface abrades away as result of this continuous exposure. As abrasion progresses, inclined surface material is lost and eventually the capability to atomize liquid is lost.

Further, the method described above spreads liquid supplied from a liquid-flow channel thinly along a smooth inclined surface, and as a result of this thin-film flow, liquid is sprayed off the end of the smooth inclined surface. However, when viscous or strongly adhering (sticky) liquid is used, liquid in the thin-film flow can become extremely thin in a local area. The locally thinned liquid can dry and congeal on the smooth inclined surface, and accumulation of solids at that point can ultimately result in clogging. In particular, clogging becomes an increasing problem as the width of the liquid spray slit is narrowed. If clogging occurs, the nozzle must be disassembled and cleaned causing unavoidable interruption of operations and lost production time.

Still further, in an annular liquid-spraying nozzle, where the liquid is made to flow as a thin-film on an inclined surface via pressurized gas, size-reduction is problematic from a structural perspective and manufacture is difficult.

Refer to Japanese Patent No. 2797080 (1998).

SUMMARY OF THE INVENTION

The present invention was developed to resolve these types of prior-art problems. Thus, it is a primary object of the present invention to provide a liquid ejecting device and method of liquid ejection that produces fine particles of uniform diameter and suppresses nozzle clogging.

To resolve the problems described above, the liquid ejecting device for the first aspect of the present invention is a device that that uses pressurized gas to eject liquid as a spray of fine particles and is provided with a main unit housing gas-flow passageways to supply pressurized gas and liquid-flow passageways to supply liquid, and a nozzle section established in the main unit with a slit-shaped liquid ejecting opening to spray liquid; the nozzle section is provided with inclined nozzle surfaces on the sides of the liquid ejecting opening, which is centrally located; gas jet openings to discharge pressurized gas are established between the inclined nozzle surfaces and sidewalls of the main unit; the liquid ejecting opening is connected with the liquid-flow passageways and the gas jet openings are connected with the gas-flow passageways; viewed in cross-section, the inclined nozzle surfaces are formed such that their extensions intersect above the liquid ejecting opening on a line extending from the liquid ejecting opening; and pressurized gas is discharged as jets along the inclined nozzle surfaces to intersect in a manner that sandwiches the liquid in between and breaks-up the liquid-flow to produce a spray of fine particles.

This structure makes it possible to break-up the liquid into fine particles immediately after release from the (position constrained) liquid ejecting opening via pressurized gas impinging from both sides, and makes it possible to generate fine particles of uniform particle diameter without having to spread the liquid into a thin-film flow after its release. Further, compared with prior-art systems that jet compressed air on an inclined surface, abrasion of inclined nozzle surfaces can be limited to achieve the positive feature of reliability improvement.

In the liquid ejecting device for the second aspect of the present invention, the inclined nozzle surfaces can be configured as a first inclined nozzle surface and a second inclined nozzle surface with the liquid ejecting opening in the center; and the gas-flow passageways can be configured as first gas-flow passageways that connect with a first gas jet opening along the first inclined nozzle surface and second gas-flow passageways that connect with a second gas jet opening along the second inclined nozzle surface.

This structure makes it possible to atomize liquid by supplying liquid and pressurized gas via three routes, which are the first gas-flow passageways, the second gas-flow passageways, and the liquid-flow passageways. In particular, single-path implementation of the liquid-flow passageways can point towards structural simplification and cost reduction compared with prior-art four-flow liquid ejecting devices that employ two or more liquids.

In the liquid ejecting device for the third aspect of the present invention, the liquid ejecting opening can be formed such that the core of the particle mist sprayed from the liquid ejecting opening is in a direction substantially perpendicular to an elongated direction of the main unit.

This structure provides the positive feature that design of the liquid ejecting device is simplified.

In the liquid ejecting device for the fourth aspect of the present invention, the angles of the inclined nozzle surfaces can be made from 20° to 70°.

This structure provides the positive feature that manufacturing can be processed easily without the necessity for processing to sharpen the end of the nozzle section.

In the liquid ejecting device for the fifth aspect of the present invention, the main unit can be configured with a circular cylindrical shape, and the liquid ejecting opening can be established around the circumference of the cylindrical main unit to radiate fine particles outward in an annular pattern.

Since this structure can spray fine particles in a radial pattern with the main unit at the center, it enables a liquid ejecting device that can efficiently disperse fine particles.

In the liquid ejecting device for the sixth aspect of the present invention, the first gas-flow passageways can extend inside the main unit and can fold-back after passing the region opposite the liquid ejecting opening to connect with the first gas jet opening.

In the liquid ejecting device for the seventh aspect of the present invention, the first gas-flow passageways can be provided with a main passageway that extends along the center axis of the main unit past the region opposite the liquid ejecting opening, and a buffer chamber that connects with passageway openings established (in the main passageway) at positions beyond the region opposite the liquid ejecting opening; and the liquid ejecting device can be configured to supply first gas to the main passageway and deliver it through the passageway openings to the buffer chamber where it is flow-regulated.

Since this structure can deliver the first gas to the first gas jet opening after flow has been redirected through the passageway openings and flow-regulated at the buffer chamber, balance between the first and second gas-flows can be more easily maintained.

In the liquid ejecting device for the eighth aspect of the present invention, the liquid ejecting opening can be opened as a straight-line slit and formed in a manner that allows fine particles sprayed from the liquid ejecting opening to move-out in a direction substantially perpendicular to the direction of the liquid-flow passageways inside the main unit.

This structure allows liquid ejected as a narrow sheet from the liquid ejecting opening to be broken-up into small particles by the jets of pressurized gas crossing above the inclined nozzle surfaces, and allows the small particles to be ejected in the form of a sheet.

In the liquid ejecting device for the ninth aspect of the present invention, the liquid-flow passageways can comprise a plurality of sub-passageways, and liquid supplied from each of the liquid-flow sub-passageways can be merged together at the passageway stage prior to the liquid ejecting opening.

In the liquid ejecting device for the tenth aspect of the present invention, the width of the liquid ejecting opening slit $d_3$ can be made wider than the width of the first gas jet opening slit $d_1$ and wider than the width of the second gas jet opening $d_2$.

In the liquid ejecting device for the eleventh aspect of the present invention, the width of the liquid ejecting opening slit $d_3$ with respect to the width of the first gas jet opening slit $d_1$ and with respect to the width of the second gas jet opening $d_2$ can be made such that $d_3 \geq 1.5\ d_1$ or $d_3 \geq 1.5\ d_2$.

The method of liquid ejection for the twelfth aspect of the present invention is a method that uses pressurized gas to eject liquid as a spray of fine particles and can include a step to form liquid supplied from liquid-flow passageways into a liquid-flow sheet through a liquid ejecting opening, which is confined to a plane at the end of the liquid-flow passageways; and a step to supply a first gas (where the pressurized gas includes a first gas and a second gas) through first gas-flow passageways, which extend substantially parallel to the liquid-flow passageways, and a second gas through second gas-flow passageways, which extend substantially parallel to the liquid-flow passageways, into regions disposed on both sides of the plane including the liquid ejecting opening, to form the first gas into a first high-speed gas-flow with a first gas jet opening, which is confined to a surface at the end of the first gas-flow passageways, to form the second gas into a second high-speed gas-flow with a second gas jet opening, which is confined to a surface at the end of the second gas-flow passageways, and to discharge the first high-speed gas-flow and the second high-speed gas-flow as surfaces that intersect on the plane of the liquid-flow sheet and thereby atomize the liquid-flow sheet into fine particles of liquid.

This makes it possible to break-up the liquid into fine particles immediately after release from the (position constrained) liquid ejecting opening via pressurized gas impinging from both sides, and makes it possible to generate fine particles of uniform particle diameter without having to spread the liquid into a thin-film flow after its release. Further, compared with prior-art systems that jet compressed air on an inclined surface, abrasion of inclined nozzle surfaces can be limited to achieve the positive feature of reliability improvement.

In another method of liquid ejection, the liquid ejecting opening can be established in the shape of the perimeter (circumference) of a circle, and fine particles can be radiated outward in an annular pattern. Since this allows fine particles to be radiated out around a circle, it enables a liquid ejecting device that can efficiently disperse fine particles.

In another method of liquid ejection, the first gas-flow passageways can extend substantially parallel to the liquid-flow passageways and can fold-back after passing the region opposite the liquid ejecting opening to connect with the first gas jet opening. This can reduce pressure losses between fold-back from the first gas-flow passageways and introduction to the first gas jet opening and makes it possible to eject the first gas with pressure essentially equal to the pressure in the second gas-flow passageways.

In another method of liquid ejection, the liquid ejecting opening can be opened as a straight-line slit and formed in a manner that allows fine particles sprayed from the liquid ejecting opening to move-out in a direction substantially parallel to the direction that the liquid-flow passageways extend. This allows liquid ejected as a narrow sheet from the liquid ejecting opening to be broken-up into small particles by the jets of pressurized gas crossing above inclined nozzle surfaces, and allows the small particles to be ejected in the form of a sheet.

DETAILED DESCRIPTION OF THE EMBODIMENTS

The following describes embodiments of the present invention based on the figures. However, the following embodiments are merely specific examples of liquid ejecting devices and methods of liquid ejection representative of the technology associated with the present invention, and the liquid ejecting device and method of liquid ejection of the present invention is not limited to the embodiments described below. Further, in the absence of specific annotation, structural component features described in the embodiment such as dimensions, raw material, shape, and relative position are simply for the purpose of explicative example and are not intended to limit the scope of the invention. Properties such as the size and spatial relation of components shown in the figures may be exaggerated for the purpose of clear explanation. In the descriptions following, components with the same name and reference sign indicate components that are the same or have the same properties and their detailed description is appropriately abbreviated. Further, a single component can serve multiple functions and a plurality of structural elements of the invention can be implemented with the same component. In contrast, the functions of a single component can be separated and implemented by a plurality of components. In addition, explanations used to describe part of one implementation mode or embodiment may be used in other implementation modes or embodiments.

First Embodiment

Figure 1:
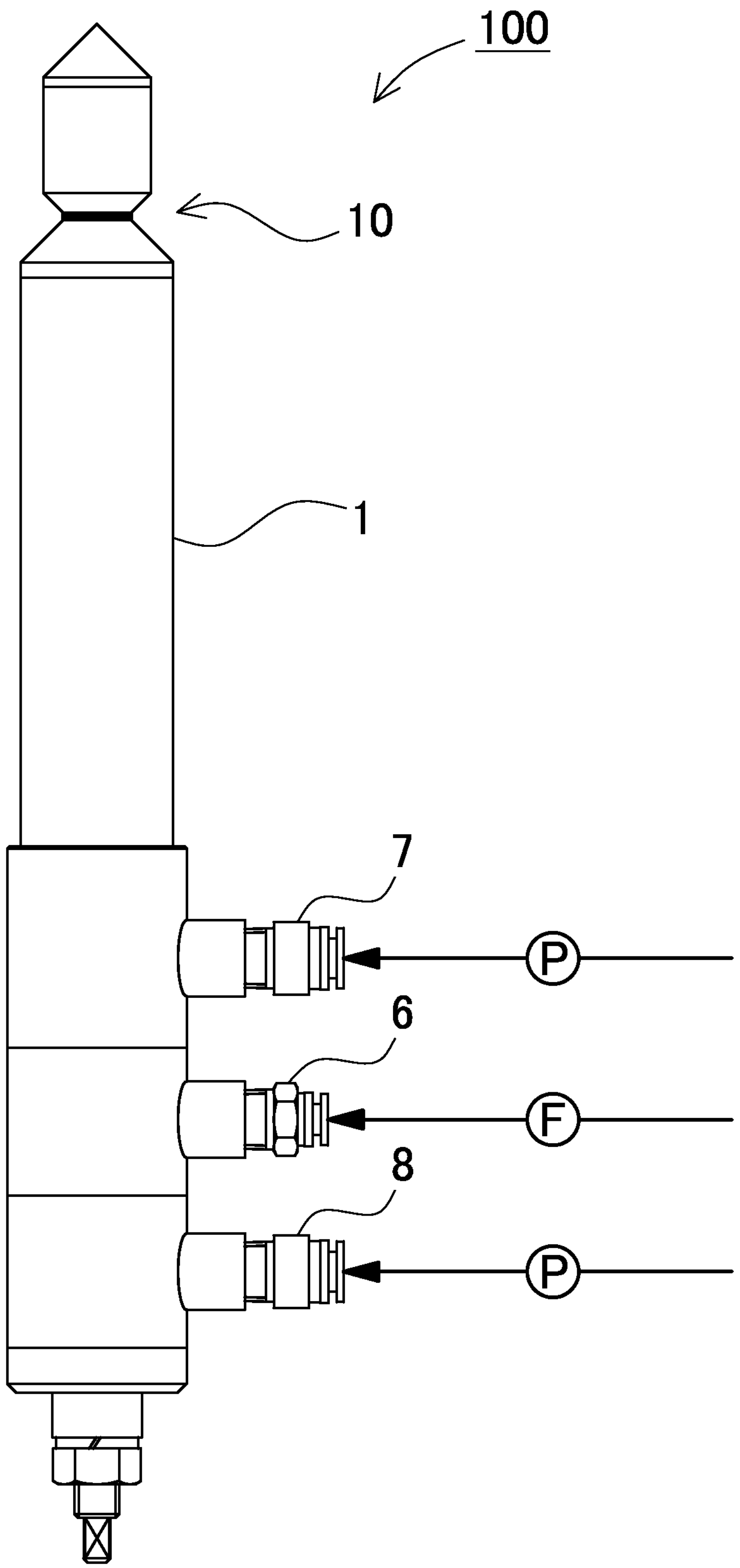
FIG. 1 is a plan view showing a liquid ejecting device for the first embodiment.
Figure 2:
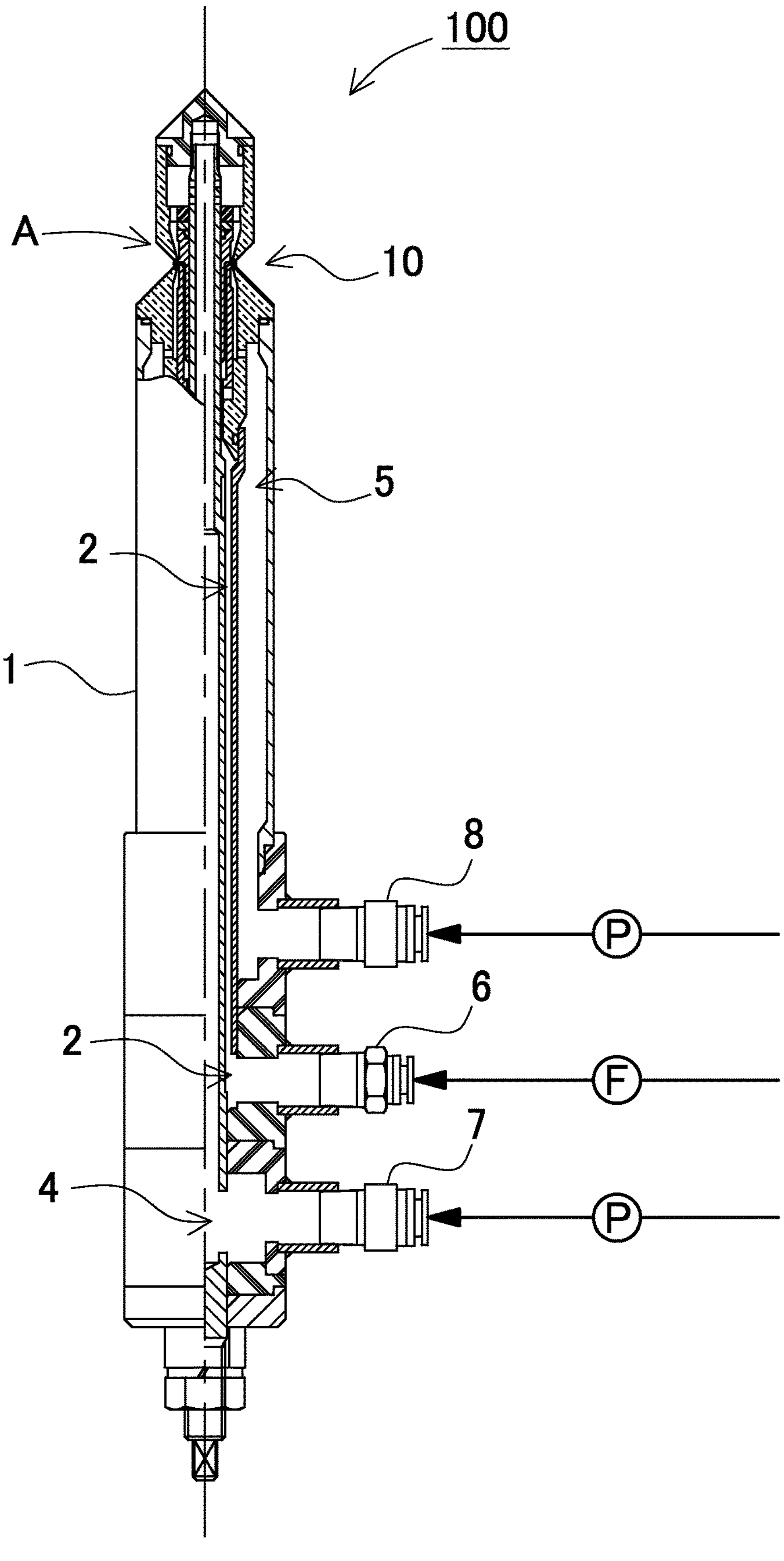
FIG. 2 is a vertical cross-section view of the liquid ejecting device in FIG. 1.
Figure 3:
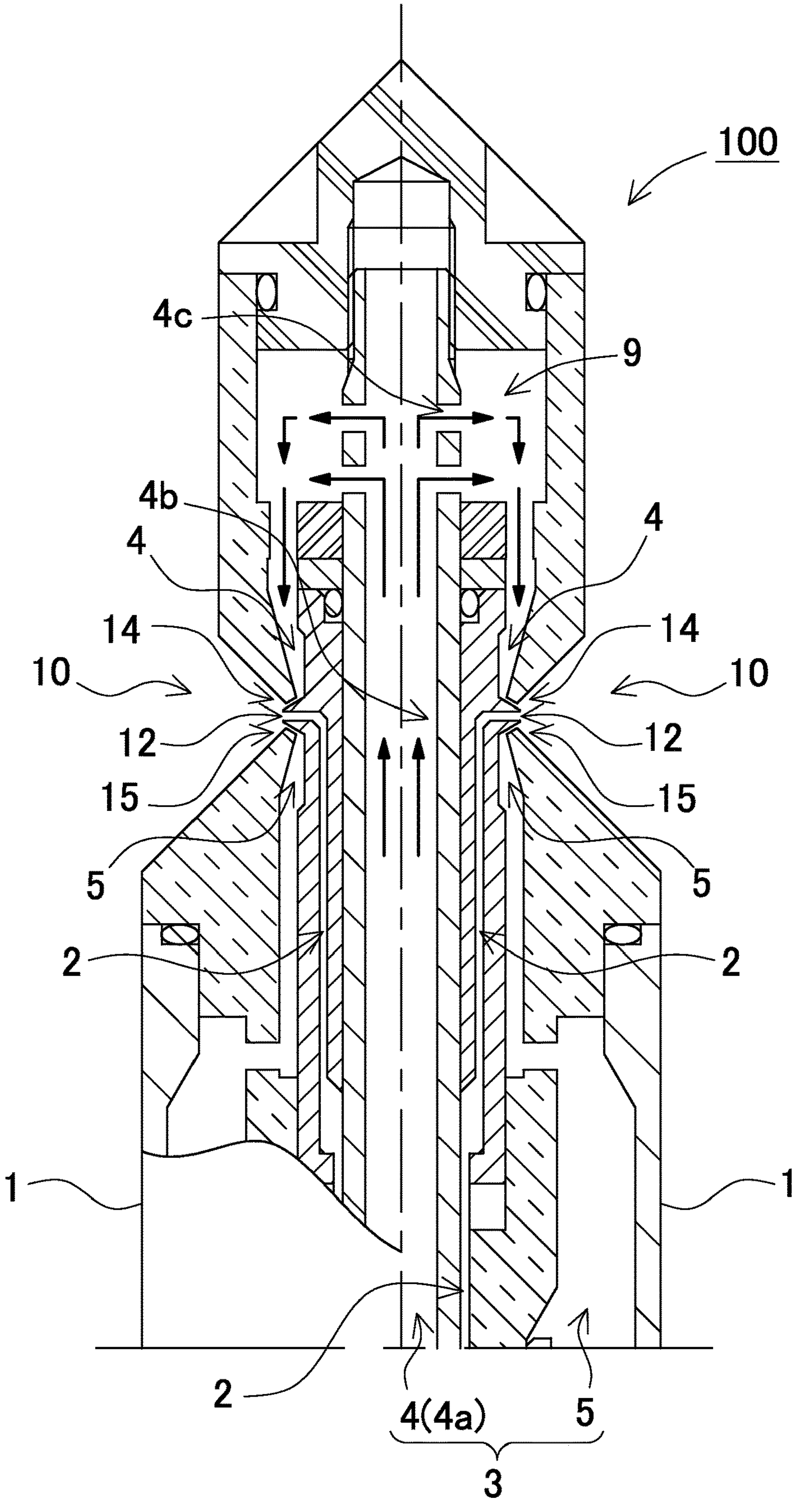
FIG. 3 is an enlarged cross-section view showing the nozzle region of the liquid ejecting device in FIG. 2.

A liquid ejecting device 100 for the first embodiment of the present invention is shown in FIGS. 1-3. FIG. 1 is a plan view showing a liquid ejecting device 100 for the first embodiment, FIG. 2 is a vertical cross-section view of the liquid ejecting device 100 in FIG. 1, and FIG. 3 is an enlarged cross-section view showing the nozzle region 10 of the liquid ejecting device 100 in FIG. 2. The liquid ejecting device 100 shown in these figures has a main unit 1 formed with the external appearance of a circular cylindrical rod that has a nozzle region 10 established in a pinched-off section near the tip. The nozzle region 10 has a slit opened around the circular circumference and fine particles of atomized liquid are ejected in an annular pattern from the slit opening. The aft end of the main unit 1 is provided with a liquid supply inlet 6 to supply liquid, and two gas supply inlets to supply gas. The gas supply inlets include a first gas supply inlet 7 to supply a first pressurized gas and a second gas supply inlet 8 to supply a second pressurized gas. Each of the pressurized gas lines are connected with separate compressors and gas flow is controlled independently. The same type of pressurized gas is used for both the first gas and the second gas. Compressed air can be used with good results as the pressurized gas. However, it should go without saying that other types of gases such as inert gases can also be used appropriately instead of air. While the gases are supplied from a common source, a configuration is established that branches at an intermediate point to allow independent adjustment of gas-flow quantities (i.e. pressure) into first gas-flow passageways 4 and into second gas-flow passageways 5. This provides balance control of conditions for fine particle generation and enables control of the shape of the ejected mist.

These gas supply inlets and liquid supply inlet 6 are disposed jutting out from the main unit 1 in a manner substantially perpendicular to the elongated direction of the main unit 1. A plumbing line (pipe) is joined in an air-tight and water-tight manner to each supply inlet for connection with a gas compressor P and a liquid pump F. In the example shown in FIGS. 1 and 2, the second gas supply inlet 8, the liquid supply inlet 6, and the first gas supply inlet 7 are disposed in that order from the bottom up.

The main unit 1 and nozzle region 10 are made of metal such as stainless steel. However, the main unit 1 and nozzle region 10 can also be made from other materials such as ceramics.

(Main Unit 1)

As shown in FIGS. 2 and 3, the interior of the main unit 1 is provided with gas-flow passageways 3 to supply pressurized gas, and liquid-flow passageways 2 to supply liquid. The liquid-flow passageways 2 are connected to the liquid supply inlet 6. The gas-flow passageways 3 are made up of first gas-flow passageways 4 and second gas-flow passageways 5, which are connected to the first gas supply inlet 7 and the second gas supply inlet 8 respectively. The first gas-flow passageways 4, the second gas-flow passageways 5, and the liquid-flow passageways 2 extend along the interior of the main unit 1 in substantially parallel disposition. In this example, the passageways are disposed coaxially around the lengthwise-extending center axis of the main unit 1 with the first gas-flow passageways 4 at the center, the liquid-flow passageways 2 concentric around those passageways, and the second gas-flow passageways 5 on the outside. This passageway arrangement allows liquid to be supplied from the center of the nozzle and first and second gases to be supplied from the two sides of the nozzle to generate fine particles in the manner described subsequently.

The liquid-flow passageways 2 bend approximately 90° at an intermediate point to connect with a liquid ejecting opening 12. As shown in FIG. 3, the first gas-flow passageways 4 include a main passageway 4*a* that extends along the center axis of the main unit 1 past a region 4*b* opposite the liquid ejecting opening 12. Further, passageway openings 4*c* are established radially around a section of the main passageway 4*a* past the region 4*b* opposite the liquid ejecting opening 12, and the first gas-flow bends 90° through those passageway openings 4*c*. The passageway openings 4*c* connect with a buffer chamber 9. In this manner, the first gas-flow passageways 4 introduce first gas from the main passageway 4*a* through the passageway openings 4*c* into the buffer chamber 9. Subsequently, the first gas-flow bends to a direction opposite the flow-direction in the main passageway 4*a* to establish first gas-flow passageways 4 with a U-turn. Finally, after leaving the buffer chamber 9 and extending to a side (the upper side in FIG. 3) of the liquid ejecting opening 12, the first gas-flow passageways 4 connect with a first gas jet opening 14 established along an inclined nozzle surface as described later.

Meanwhile, the second gas-flow passageways 5 connect with a second gas jet opening 15 established along an inclined nozzle surface on the near side of the liquid ejecting opening 12. This layout allows first gas and second gas to be stably supplied to both sides of the liquid ejecting opening 12. In particular, instead of ejecting the first gas immediately after reversing the direction of the first gas-flow passageways 4, the first gas is flow-regulated in the buffer chamber 9 after initially passing the region 4*b* opposite the liquid ejecting opening 12 and being turned through the first gas-flow passageways 4. This smoothes the first gas-flow and improves its uniformity. Subsequently, the first gas-flow passes from the buffer chamber 9 through a straight-line section to the first gas jet opening 14 slit where it is sped-up and ejected. In this manner, by establishing a buffer chamber 9 in the flow bending-region of the first gas-flow passageways, large flow velocity reduction in the first gas-flow compared to the second gas-flow can be prevented and both gases can be ejected with no significant flow imbalance. To allow flow-regulation of the first gas after being turned from the main passageway 4*a*, the buffer chamber 9 is established with a large volume having a side wider than width of the passageway openings 4*c*. Here, the passageway openings 4*c* are established at two separated locations along the center axis of the main passageway 4*a*, and the buffer chamber 9 connected with the two passageway openings 4*c* is made sufficiently large to enable flow-regulation and delivery to the passageway directed towards the first gas jet opening 14.

In addition, because pressure in the first and second gas-flow passageways can be controlled independently, the spray-pattern can be changed by adjusting (balancing) the amount of flow in the two sets of passageways. Specifically, the spray-pattern of fine liquid droplets (particles) ejected from the nozzle can be adjusted from a spray-pattern that fans-out with a central plane substantially perpendicular to the center axis of the main unit 1 to a pattern with its central plane at an inclined angle with respect to the center axis of the main unit 1.

(Nozzle Region 10)

Figure 4:
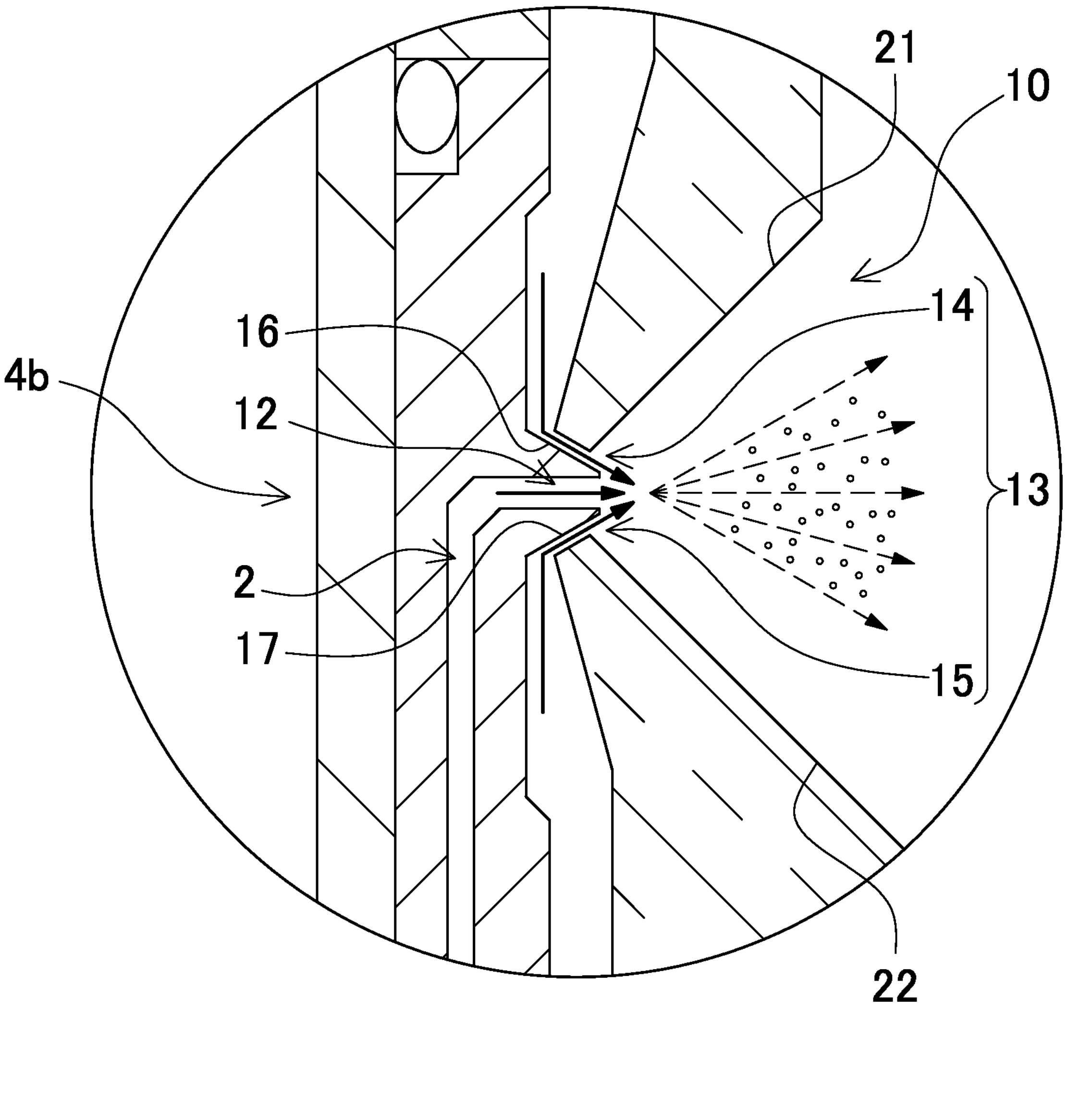
FIG. 4 is a further enlarged cross-section view of the nozzle region in FIG. 3.

As shown in the cross-section view of FIG. 3 and the enlarged cross-section view of FIG. 4, the nozzle region 10 has a slit-shaped liquid ejecting opening 12 at the center with inclined nozzle surfaces established on both sides. Here, "slit-shaped" means that the tip of the liquid ejecting opening 12 (around the main unit 1) resides in a plane. Further, each inclined nozzle surface is a smooth surface. The first gas jet opening 14 and the second gas jet opening 15 are established along those inclined nozzle surfaces. The nozzle region 10 is established within the valley at the bottom of a pinched-off section of the main unit 1. From a different perspective, inclined surfaces of the main unit 1 (in the pinched-off section) are established fanning-out from both sides of the nozzle region 10. The tips of those main unit inclined surface regions do not make contact with the inclined nozzle surfaces, but rather gas jet openings 13 for ejecting gas are established by gaps formed between the ends of the main unit inclined surfaces and the inclined nozzle surfaces.

FIG. 4 is a further enlarged cross-section view of the nozzle region 10 in FIG. 3. In this example, the upper side of the nozzle region 10 is allocated as the first inclined nozzle surface 16 and the lower side is allocated as the second inclined nozzle surface 17. The first gas jet opening 14 is established where the tip of a first main unit inclined surface 21 comes in close proximity to the first inclined nozzle surface, and the second gas jet opening 15 is established where the tip of a second main unit inclined surface 22 comes in close proximity to the second inclined nozzle surface. First gas supplied from the first gas-flow passageways flows through the slit of the first gas jet opening 14 to establish a first high-speed gas-flow, and second gas supplied from the second gas-flow passageways flows through the slit of the second gas jet opening 15 to establish a second high-speed gas-flow. These high-speed gas-flows originating from oblique directions intersect and collide with the narrow sheet of liquid emanating from the liquid ejecting opening 12 slit. The first gas jet opening 14 and the second gas jet opening 15 are slits that are narrower than both the first gas-flow passageways 4 and second gas-flow passageways 5, and those gas jet openings increase the flow velocity of the first and second gas flows and form them into layers of high-speed gas-flow. By disposing the high flow velocity layers of the first high-speed gas-flow and the second high-speed gas-flow in a manner that intersects on the plane of the liquid-flow sheet, the liquid-flow sheet can be efficiently broken-up to form very small particles.

Since (the nozzle-stage of) the liquid-flow passageways 2 in this structure is confined within planes on both sides of the liquid ejecting opening, the thickness of the liquid-flow sheet is set by the width between those planes and non-uniform liquid-flow sheet thickness is avoided. As a result, it is possible to generate fine particles of uniform diameter and produce a high-quality spray. Further, since the liquid-flow sheet is impacted with gas jets from both sides, the liquid-flow sheet can be reliably broken-up to generate extremely small particles.

In this manner, supplying liquid and pressurized gas via three passageway routes, which are the first gas-flow passageways 4, the second gas-flow passageways 5, and the liquid-flow passageways 2, makes it possible to atomize the liquid. In particular, since a single liquid-flow passageway route is implemented, structure can be simplified compared with prior-art four-flow liquid ejecting devices that employ two or more liquids. Liquid supply pumps and measurement instruments can be reduced by the amount of one passageway route, which also eases maintenance requirements and leads to overall cost reduction. Further, by making the slit width of the liquid ejecting opening 12 larger than that of the gas jet openings, the amount of liquid supplied can be increased and time-based production rate of liquid micro-droplets can be increased. In addition, by widening the liquid-flow passageways 2 and reducing flow resistance (drag), the positive feature of suppressing (passageway/opening) clogging by liquids with suspended material can be achieved.

Figure 5:
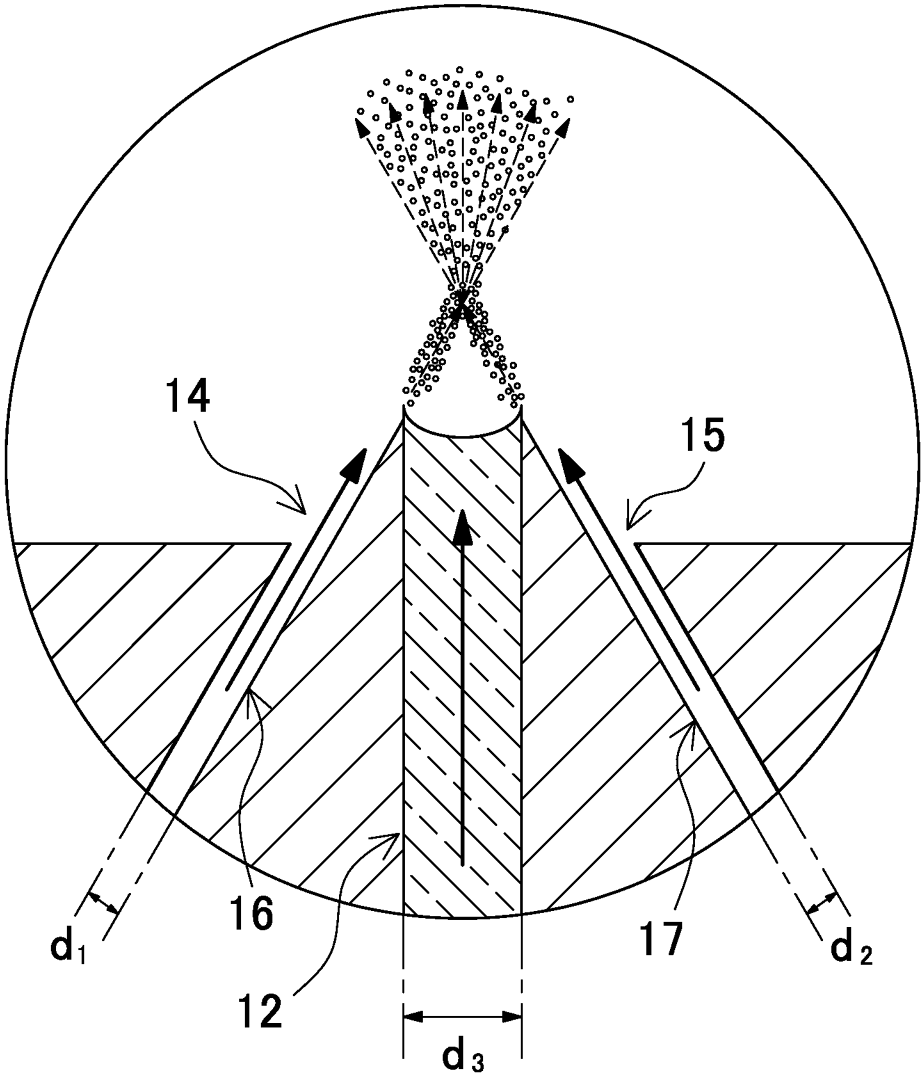
FIG. 5 is a further enlarged cross-section schematic of the nozzle region in FIG. 4.

In particular, in the case where a viscous or sticky liquid is used, extreme thinning and local drying has occurred for liquid flowing in a thin-film along an inclined surface. Evaporation of liquid containing suspended material has caused minute solid particles to deposit and their accumulation has led to the problem of nozzle clogging. In contrast, as shown in FIG. 5, the nozzle for the present embodiment does not supply liquid to an inclined surface, but rather supplies liquid from the center of a wide nozzle. The liquid flow is not thinned any more than necessary, the possibility of evaporation is reduced, and clogging of the opening can be avoided. As a result, nozzle spray stability and reliability can be increased, and the frequency of nozzle cleaning operations to avoid clogging can be reduced. This achieves the positive feature of simplifying maintenance operations.

As shown in FIG. 5, when the liquid-flow sheet, which is thicker than the liquid thin-film flows in prior-art, is ejected from the liquid ejecting opening 12, the first high-speed gas-flow and the second high-speed gas-flow cut-away and fragment the liquid-flow sheet from edges on both sides where it interfaces with the first inclined nozzle surface 16 and second inclined nozzle surface 17. Further, as a result of the angled spray of fragmented liquid particles (droplets) extending from the inclined surfaces on both sides, particles propelled from both sides collide in a region above the liquid ejecting opening 12 yielding another level of fragmentation. This additional fine particle formation achieves the positive feature of promoting further particles size-reduction and dispersion.

The liquid ejecting opening 12 slit width $d_3$ is made wider than both the first gas jet opening 14 slit width $d_1$ and the second gas jet opening 15 slit width $d_2$. Preferably $d_3 \geq 1.5\ d_1$ and $d_3 \geq 1.5\ d_2$, and more preferably $d_3 \geq d_1 + d_2$. Although it is desirable to make $d_1$ and $d_2$ the same size, it is also possible to make $d_2 \geq d_1$. In terms of specific numeric values, the slit width $d_1$ of the first gas jet opening 14 and the slit width $d_2$ of the second gas jet opening 15 are made 0.15 mm to 0.35 mm, and the slit width $d_3$ of the liquid ejecting opening 12 is made 0.3 mm to 1.3 mm.

Since the present embodiment does not spread liquid into a thin-film flow after its release as in prior-art devices, there is no need to provide inclined surfaces to spread the liquid into a thin-film. Rather, immediately after liquid is discharged from liquid ejecting opening 12, which is constrained by initial design, it can be broken-up into fine particles by pressurized gas impinging from both sides. In addition, since this configuration can reduce the distance from liquid release at the liquid ejecting opening 12 to the gas impact points, efficiency can be further improved. By disposing the discharged liquid-flow sheet within the region where the pressurized gases intersect, liquid can be atomized efficiently and particles of uniform diameter can be generated. Further, compared with prior-art systems that blow compressed air on inclined surfaces, the present embodiment reduces inclined nozzle surface wear to achieve improved reliability.

Preferably the first inclined nozzle surface 16 and the second inclined nozzle surface 17 are made approximately symmetric on both sides of the central liquid ejecting opening 12. The angle of inclination of the inclined nozzle surfaces is made 20° to 70°. This eliminates the need for processing to sharpen the tip of the nozzle region 10, and achieves the positive feature of simplifying manufacture. Edges at the tip of the inclined nozzle surfaces can be beveled as well. Experiments by the present applicant have confirmed that the size of particles generated does not change even when the tip of the liquid-flow passageway opening is not sharp. Further, by making the angle at the vertex of the inclined nozzle surfaces a large angle, the nozzle can be made more robust. By not making sharp edges at the nozzle tip, damage to those edges can be prevented, and damage other objects caused by a sharp nozzle tip can be avoided. In addition, by making the region indicated as region A in FIG. 2 a large diameter, nozzle tip edges can be protected during main unit 1 insertion and maintenance.

Figure 6:
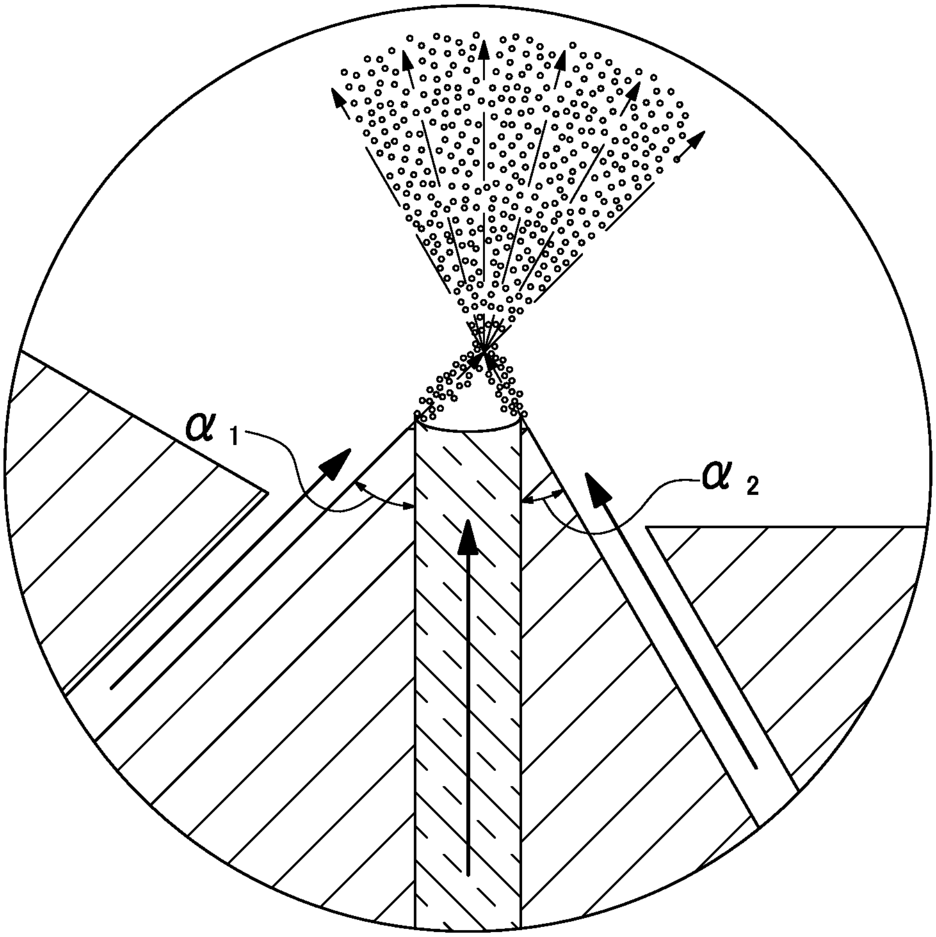
FIG. 6 is a vertical cross-section view showing an alternative example of the liquid ejecting device.

In the example above, the first and second inclined nozzle surfaces are configured with lateral symmetry (around the central liquid ejecting opening). However, the present invention is not limited to that structure and asymmetric inclined nozzle surfaces are also possible. For example, the example shown in FIG. 6 has the angle of inclination $\alpha_1$ of the first inclined nozzle surface made larger than the angle of inclination $\alpha_2$ of the second inclined nozzle surface. This establishes different angles for introduction of the two gases and allows the spray pattern to be altered to incline the center plane of the spray pattern to the right (in the figure) of a plane extending from the center of the liquid ejecting opening. Since the method of changing the spray pattern by adjusting the amount of flow of each gas also changes the particle size distribution, the method of introducing the gases at different angles has the merit that the flow conditions for both gases can be the same. For the case of installation in a spray-drying apparatus, it is possible to adjust the angles for compatibility with the shape and dimensions of the dryer or furnace.

Second Embodiment

Figure 7A:
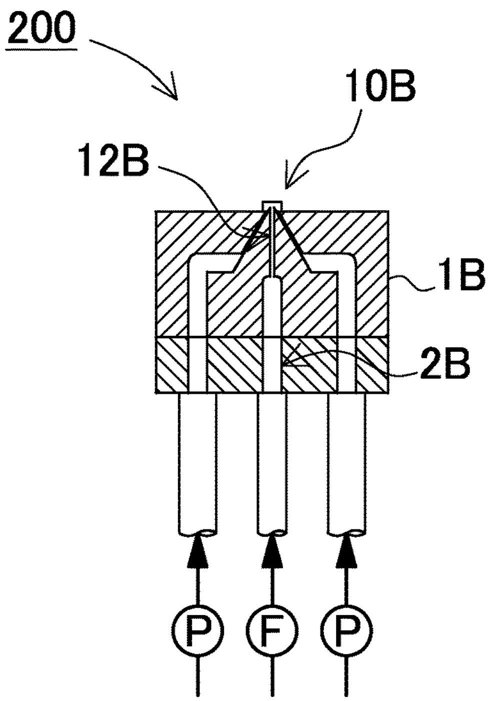
FIG. 7A is a (front) cross-section view showing a liquid ejecting device for the second embodiment.
Figure 7B:
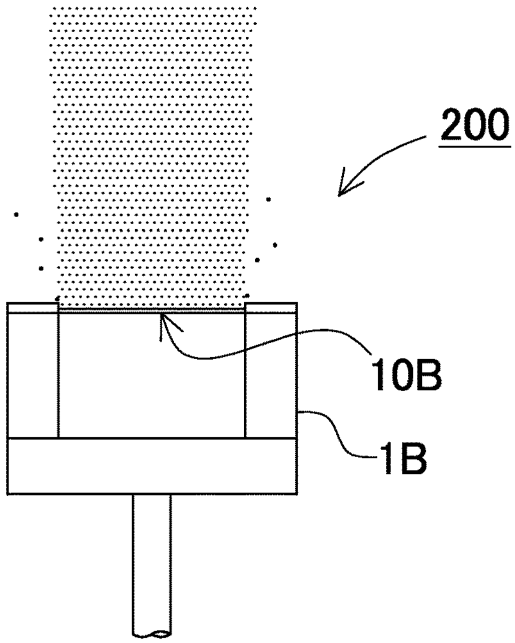
FIG. 7B is a side view of the liquid ejecting device in FIG. 7A.

The example above describes an annular nozzle in which the liquid-flow passageways turn the flow in the vicinity of the nozzle region to eject liquid in a ring (hollow-cone pattern) around the outside of a circular cylinder. However, the present invention is not limited to that structure, and a liquid ejecting device that connects liquid-flow passageways with the nozzle region in a straight-line substantially parallel to the direction of extension of the main unit can also be implemented. This type of embodiment is described based on FIGS. 7A, 7B, and 8 as the liquid ejecting device 200 for the second embodiment. The liquid ejecting device 200 shown in these figures has a block-shaped main unit 1B with the nozzle region 10B provided on the upper surface of the block. As shown in the cross-section of FIG. 7A, the interior of the main unit 1B is plumbed with liquid-flow passageways 2B to supply liquid, first gas-flow passageways 4 to supply the first gas, and second gas-flow passageways 5 to supply the second gas. These passageways are connected with a liquid supply source and compressors for each gas.

Figure 8:
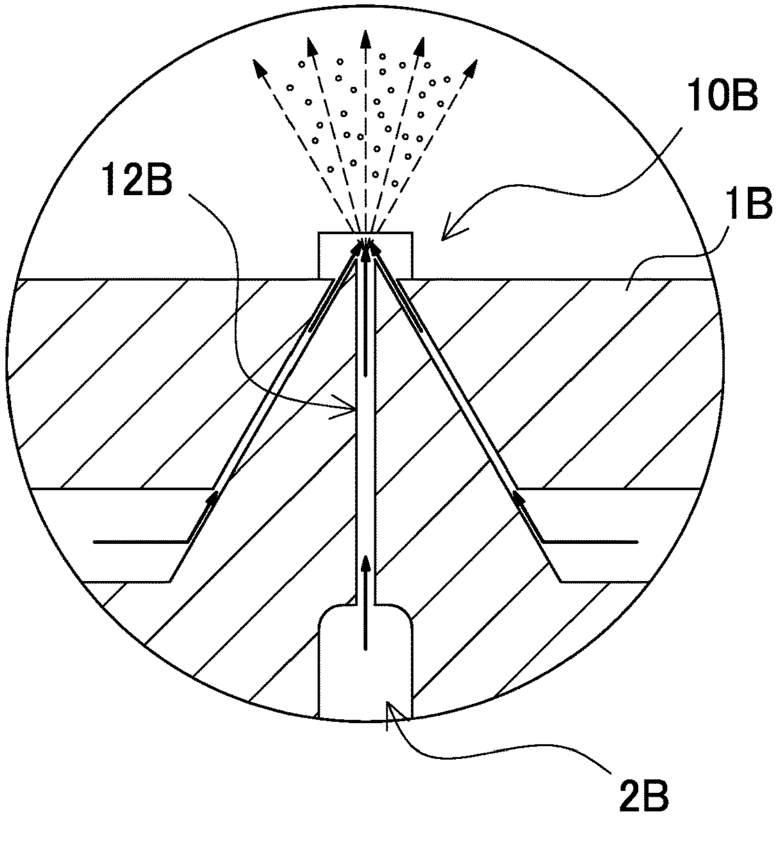
FIG. 8 is a further enlarged cross-section view of the nozzle region in FIG. 7A.

As shown in the enlarged cross-section of FIG. 8, the liquid-flow passageways 2B connect with a liquid ejecting opening 12B in the center of the nozzle region 10B. The liquid ejecting opening 12B has a slit shape that is narrower than the liquid-flow passageways 2B to increase the flow velocity and form it into a liquid-flow sheet. A first gas jet opening 14 connected with the first gas-flow passageways 4 and a second gas jet opening 15 connected with the second gas-flow passageways 5 are established on either side of the liquid ejecting opening 12B. As in the first embodiment, inclined nozzle surfaces are established in the nozzle region 10B on both sides of the liquid ejecting opening 12B. The first gas jet opening 14 is formed with the first inclined nozzle surface 16 and the second gas jet opening 15 is formed with the second inclined nozzle surface 17. A first high-speed gas-flow discharged from the first gas jet opening 14 and a second high-speed gas-flow discharged from the second gas jet opening 15 are also formed in the nozzle region 10B and intersect with the liquid-flow sheet discharged from the liquid ejecting opening 12B to atomize liquid at the outlet. As shown in the side view of FIG. 7B, this forms a sheet of fine particles of uniform size, and allows a narrow particle size distribution to be obtained.

Figure 9A:
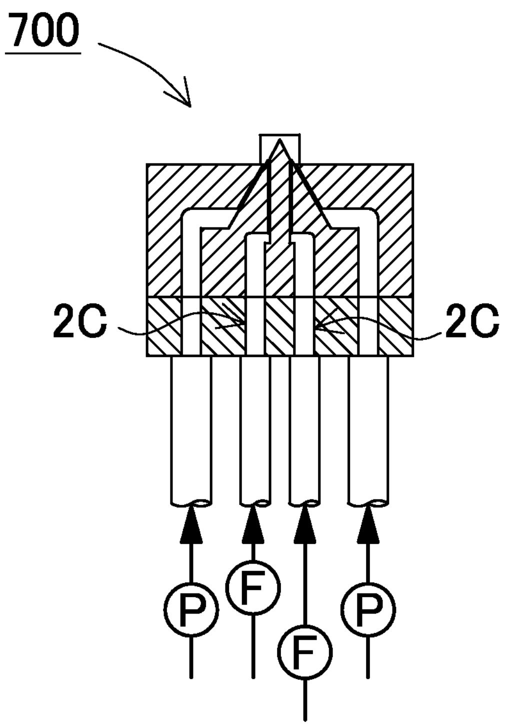
FIG. 9A is a (front) cross-section view showing the nozzle region of a four-fluid liquid ejecting device comparison example.
Figure 9B:
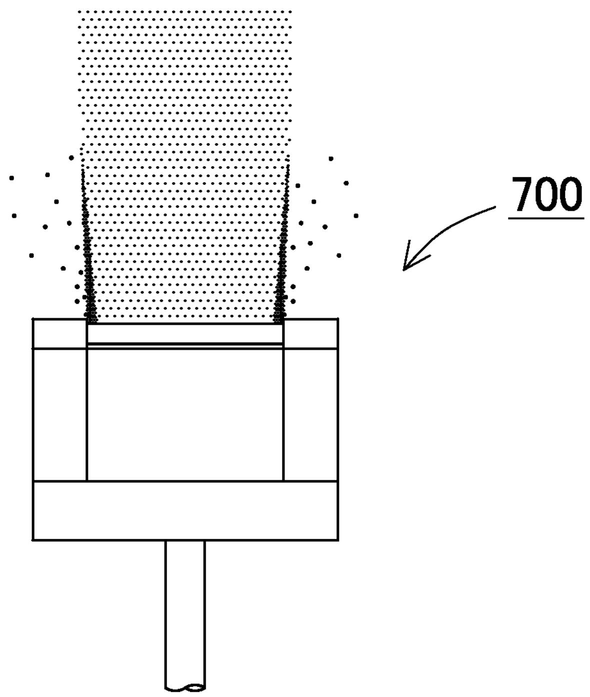
FIG. 9B is a side view of the comparison example in FIG. 9A.

For comparison purposes, a four-flow liquid ejecting device 700 with two sets of liquid-flow passageways 2C was prototyped as shown in FIG. 9A, and the particle size distribution was measured. In this liquid ejecting device 700, liquid is ejected after spreading it into a thin-film flow along inclined surfaces at the tip of the nozzle. As shown in FIG. 9B, particle size at the lateral ends of the liquid flow layers was large, and non-uniform particle size distribution was confirmed. This was due to non-uniform film thickness developing at the stage where liquid is spread into a thin-film flow along the inclined surfaces. In particular, since the liquid thin-film flow becomes thicker at the lateral ends of the nozzle, larger diameter particle generation can be expected in those lateral end regions. In contrast, there are no operations to spread liquid into a thin-film flow on an inclined surface in the second embodiment described above. The second embodiment is configured to rapidly break-up the liquid after its release, and it can achieve efficient and small particle size atomization of the liquid.

Figure 10:
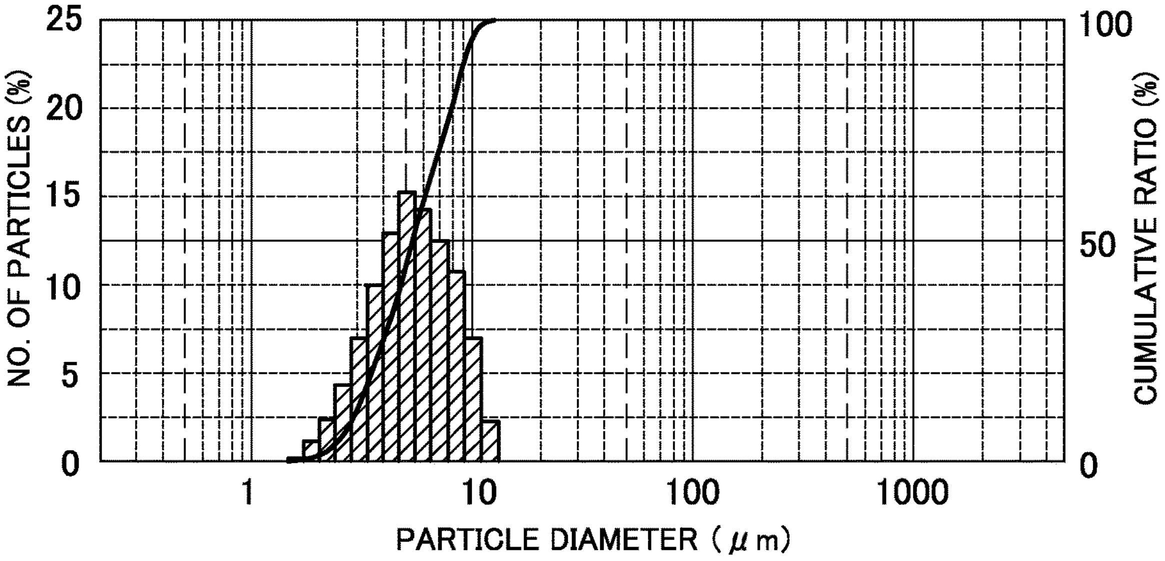
FIG. 10 is a graph showing the particle size distribution obtained with the second embodiment of the liquid ejecting device.
Figure 11:
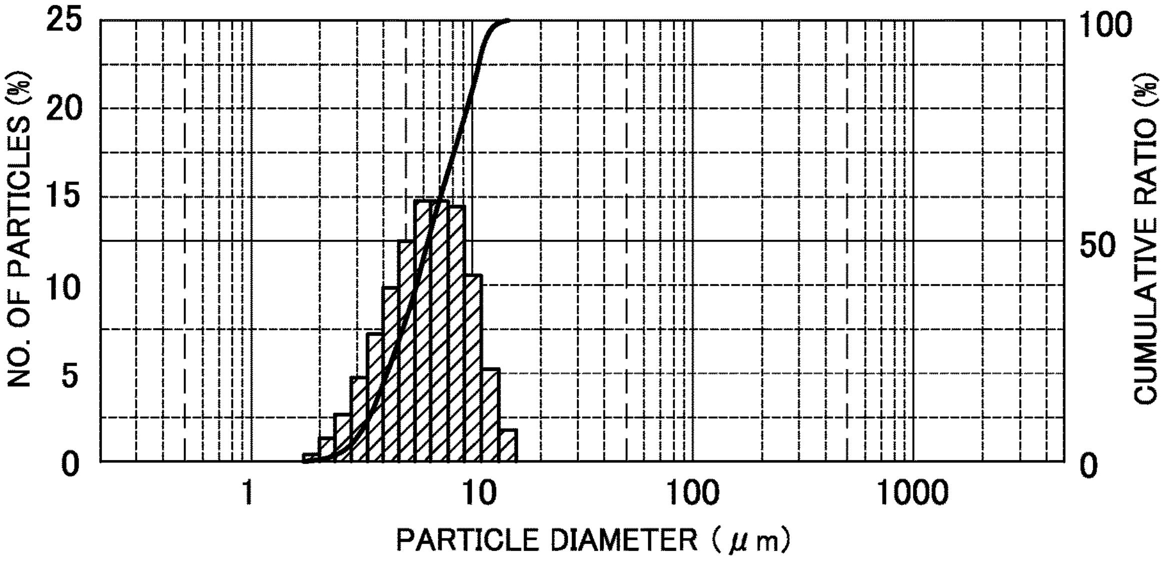
FIG. 11 is a graph showing the particle size distribution obtained with the liquid ejecting device comparison example.

The three-flow liquid ejecting device 200 for the second embodiment shown in FIG. 7 and the four-flow comparison example liquid ejecting device 700 shown in FIG. 9 were operated under prescribed conditions and particle size distribution results for the generated particles are shown in Table 1 and in the graphs of FIG. 10 (second embodiment) and FIG. 11 (comparison example). Here, FIGS. 10 and 11 show results for particles generated under the conditions of the first row of the second embodiment and the first row of the comparison example in Table 1. As shown in these figures, it was confirmed that the particle size distribution for the second embodiment was narrower (sharper) meaning that particles of consistent size were generated. Further, as shown in Table 1, although the quantity of gas used was less for the second embodiment, the average particle size generated was smaller than for the comparison example. In addition, as the liquid flow quantity was increased, difference in the maximum particle size produced for the two cases becomes apparent, and the sharpness of the second embodiment particle size distribution is made even clearer.

TABLE 1

| | Flow conditions | | | Particle size results | | | | | |
|---|---|---|---|---|---|---|---|---|---|
| Parameter | Pre-regulation pressure MPa | Gas flow rate NL/min | Liquid flow rate g/min | D10 μm | D50 μm | D90 μm | SMD μm | Mode particle size μm | Maximum particle size μm |
| comparison example | 0.6 | 93 | 15 | 3.35 | 6.32 | 10.56 | 5.54 | 6.57 | 15.63 |
| comparison example | 0.6 | 93 | 30 | 3.03 | 6.98 | 12.78 | 5.60 | 9.29 | 22.10 |
| comparison example | 0.6 | 60 | 30 | 3.20 | 9.29 | 17.40 | 6.61 | 11.05 | 26.28 |
| comparison example | 0.6 | 30 | 30 | 7.69 | 20.38 | 36.36 | 13.93 | 26.28 | 53.00 |
| second embodiment | 0.6 | 74 | 15 | 2.91 | 5.34 | 9.15 | 4.77 | 5.52 | 13.14 |
| second embodiment | 0.6 | 80 | 30 | 3.32 | 6.18 | 10.31 | 5.44 | 6.57 | 15.63 |
| second embodiment | 0.6 | 60 | 30 | 3.78 | 7.40 | 12.50 | 6.36 | 9.29 | 18.58 |
| second embodiment | 0.6 | 30 | 30 | 4.96 | 14.97 | 26.38 | 9.88 | 22.10 | 44.00 |

D10 particle diameter where 10% of the population has a smaller diameter
D50 particle diameter where 50% of the population has a smaller diameter
D90 particle diameter where 90% of the population has a smaller diameter
SMD Sauter mean diameter In this manner, a three-flow straight-line liquid ejecting device can achieve a spray with uniform particle size while making the device compact. In prior-art liquid ejecting devices that spray in an annular or hollow-cone pattern similar to the first embodiment, size reduction (miniaturization) is difficult because of the requirement to form the inclined nozzle surfaces, which establish the liquid thin-film flow, in a ring shape. Accordingly, while easily manufactured straight-line liquid ejecting devices have been implemented via prior-art, they are plagued by liquid thin-film flow thickness non-uniformity particularly at the lateral ends of the nozzle (as described above), and as a result have the drawback that a large quantity of coarse grained particles are produced. In contrast, the three-flow liquid ejecting device for the second embodiment does not require the liquid-flow sheet to be spread-out as a thin-film flow on an inclined surface as in prior art. Therefore, although the second embodiment has a straight-line structure, it has the outstanding feature that high-quality atomization with uniform particle size distribution can be achieved.

Third Embodiment

Figure 12A:
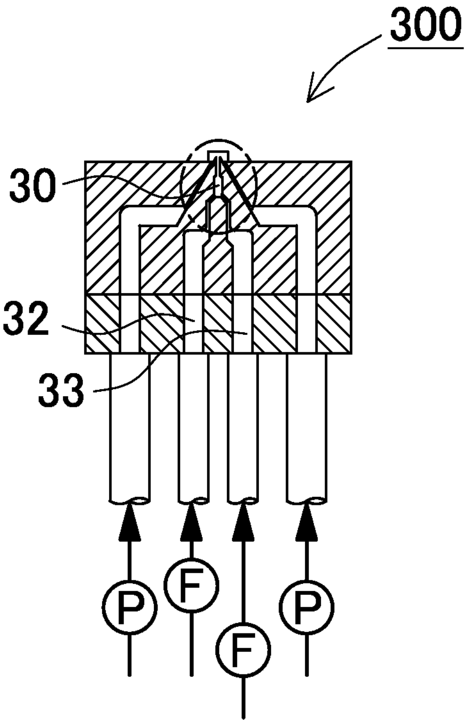
FIG. 12A is a (front) cross-section view showing a liquid ejecting device for the third embodiment.
Figure 12B:
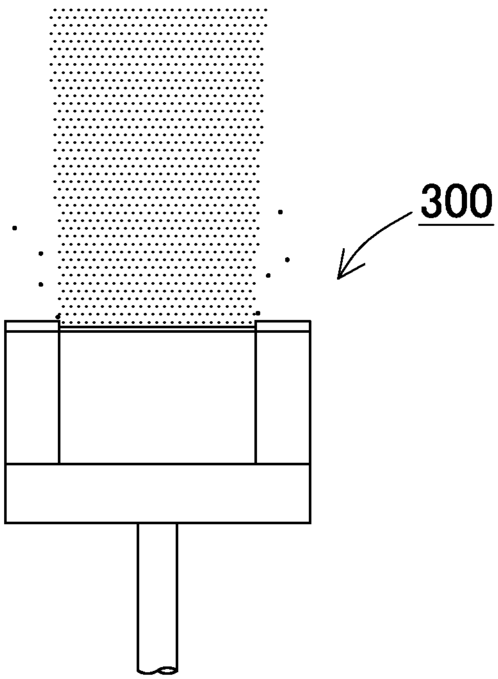
FIG. 12B is a side view of the liquid ejecting device in FIG. 12A.
Figure 12C:
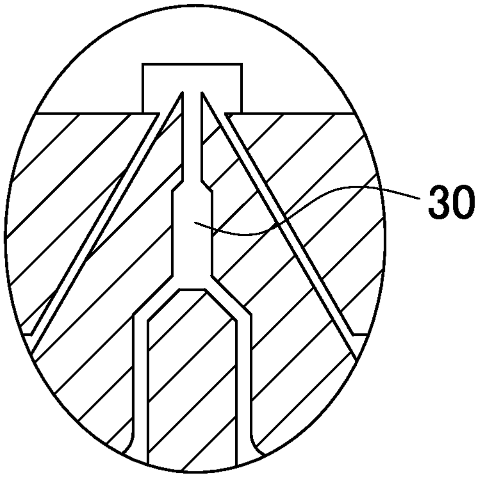
FIG. 12C is an enlarged cross-section view of a critical region of the liquid ejecting device in FIG. 12A.

Although the straight-line liquid ejecting device described above for the second embodiment has a single set of liquid-flow passageways, a structure is also possible that, for example, mixes and supplies two or more liquids. In that case, the liquid-flow passageways converge into a single path at a stage prior to the nozzle that ultimately sprays liquid particles, and in that respect it is the same as a three-flow nozzle. The third embodiment shown in FIGS. 12A-12C serves as one example of a liquid ejecting device with two sets of liquid-flow passageways that converge immediately prior to a three-flow nozzle. The liquid ejecting device 300 shown in the figures has liquid-flow passageways with two sub-passageway 32, 33 branches. The nozzle ends of the two liquid-flow sub-passageways 32, 33 converge and connect with a liquid mixing chamber 30 to mix the liquids. Different liquids are supplied by the two liquid-flow sub-passageways 32, 33 for mixing. The liquid-flow sub-passageways 32, 33 are narrowed in the region connected to the liquid mixing chamber 30 to increase the flow velocity of each liquid prior to introduction into the liquid mixing chamber 30. This facilitates efficient mixing of the liquids inside the liquid mixing chamber 30.

Other components, such as the gas-flow passageways, are essentially the same as those in the second embodiment shown in FIG. 7. In the same manner as the previously described first and second embodiments, the third embodiment can efficiently atomize a liquid-flow sheet, which is thicker than that in prior art, into fine particles. In this example, the liquid mixing chamber 30 where the liquids are mixed is disposed immediately before to the nozzle. Since this allows liquid to be quickly ejected into fine particles after mixing, it is suitable for applications handling highly reactive liquids or liquids that are difficult to maintain in a mixed state for a sustained period. However, it should go without saying that, depending on chemical reactions and other conditions, configurations that mix the two liquids at a previous stage further from the nozzle are also possible. In addition, liquid mixing is not limited to two liquids and three or more liquids can also be mixed together. Further, not only can different liquids be mixed together, configurations that mix liquids of the same type can also be implemented.

Fourth Embodiment

Figures 13A, 13B:
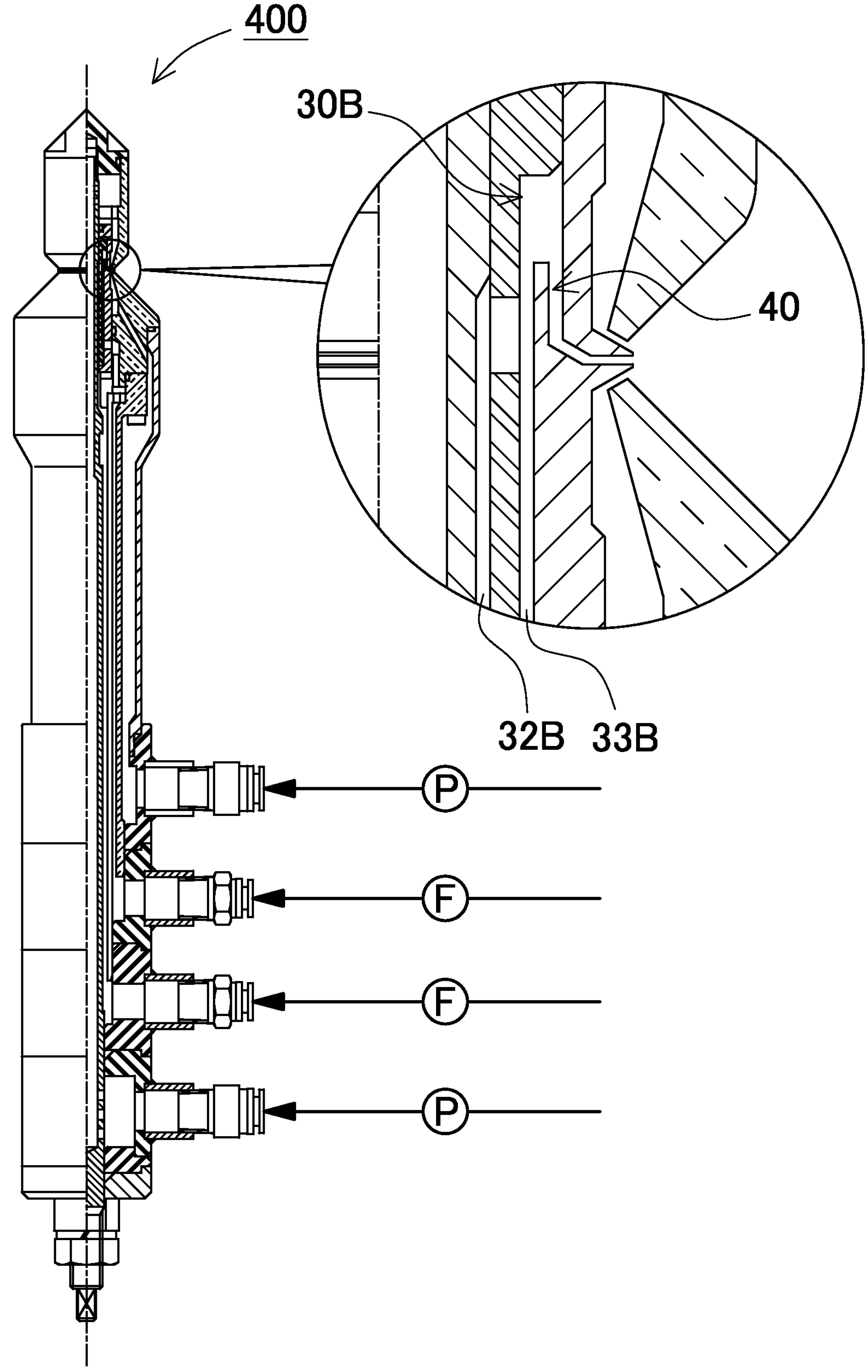
FIG. 13A is a cross-section view showing a liquid ejecting device for the fourth embodiment.
FIG. 13B is an enlarged cross-section view of a critical region of the liquid ejecting device in FIG. 13A.
Figure 14:
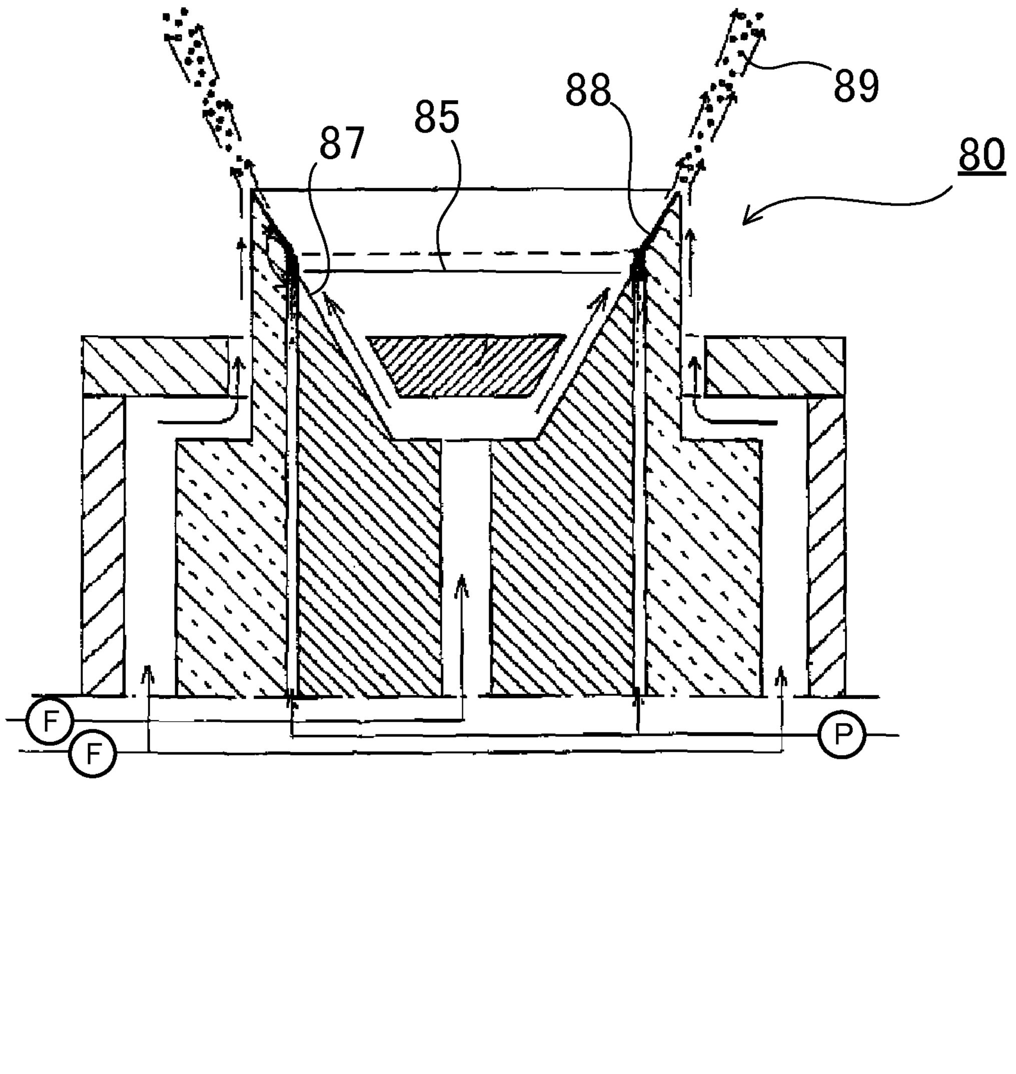
FIG. 14 is a cross-section view showing the nozzle of a prior-art liquid ejecting device.

It should be clear that a branched liquid-flow passageway structure is not limited to straight-line liquid ejecting devices and can also be implemented in an annular liquid ejecting device such as that described previously in the first embodiment. This type of example is described as the fourth embodiment shown in FIG. 13. The liquid ejecting device 400 shown in this figure is provided with two sub-passageways 32B, 33B that supply two liquids to a liquid mixing chamber 30B, and is also provided with a flow-regulating baffle structure 40. This allows smooth ejection of the mixed liquid to form fine particles.

As described above, by employing a mixing configuration that uses a flow-regulating baffle structure, and by appropriate positioning of openings and slits at the outlets of flow-paths that pass liquids through multiple coaxial paths utilizing a plurality of liquid-flow sub-passageways, liquid mixing can performed with no wasted operations.

As described above, by ejecting liquid from the center of a nozzle and discharging pressurized gas from both sides in a manner that intersects with the liquid flow, a high quality fine particle spray can be achieved where the size distribution of generated particles approaches uniformity The liquid ejecting device and method of liquid ejection of the present invention can be advantageously applied to generate extremely small particles in the field of fine (high precision, high purity) chemicals. It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2012-074616 filed in Japan on Mar. 28, 2012, the content of which is incorporated herein by reference.

The invention claimed is:

1. A liquid ejecting device that uses pressurized gas to eject liquid as a spray of fine particles, the liquid ejecting device comprising:

a main unit housing a gas-flow passageway to supply pressurized gas and a liquid-flow passageway to supply liquid; and a nozzle section established in the main unit with a single slit-shaped liquid ejecting opening for discharging a liquid-flow sheet on a liquid-flow plane, wherein the nozzle section is provided with inclined nozzle surfaces on opposite sides of the liquid ejecting opening, the liquid ejecting opening being centrally located with respect to the inclined nozzle surfaces, wherein gas jet openings for discharging pressurized gas are established between the inclined nozzle surfaces and tips of sidewalls of the main unit, the inclined nozzle surfaces being protruded from the main unit and partially exposed from the main unit, wherein the liquid-flow plane is perpendicular to the central axis of the main unit, the liquid ejecting opening is connected with the liquid-flow passageway and the gas jet openings are connected with the gas-flow passageway;

wherein, viewed in cross-section, the inclined nozzle surfaces are oriented such that their extensions intersect in the liquid-flow plane that includes the slit-shaped liquid ejecting opening, the intersection being located outside the main unit and radially outside of the liquid ejecting opening, wherein pressurized gas can be discharged as jets along the inclined nozzle surfaces to intersect in a manner that sandwiches the liquid in between and breaks-up the liquid-flow to produce a spray of fine particles, and wherein the main unit is configured with a circular cylindrical shape, and the liquid ejecting opening is established around the circumference of the cylindrical main unit to radiate fine particles outward in an annular pattern.

2. The liquid ejecting device as cited in claim 1, wherein the inclined nozzle surfaces are configured as a first inclined nozzle surface and a second inclined nozzle surface with the liquid ejecting opening in the center; and the gas-flow passageway is configured as a first gas-flow passageway that connects with a first gas jet opening on the first inclined nozzle surface, and a second gas-flow passageway that connects with a second gas jet opening on the second inclined nozzle surface.

3. The liquid ejecting device as cited in claim 1, wherein the liquid ejecting opening is formed such that the core of the fine particles ejected from the liquid ejecting opening are discharged in the liquid-flow plane which is substantially perpendicular to an elongated direction of the main unit.

4. The liquid ejecting device as cited in claim 1, wherein the angles formed by the inclined nozzle surfaces and a flow direction of liquid flowing through the liquid ejecting opening are in a range from 20° to 70°.

5. The liquid ejecting device as cited in claim 1, wherein the first gas-flow passageway extends inside the main unit and turns back after passing the region opposite the liquid ejecting opening to connect with the first gas jet opening.

6. The liquid ejecting device as cited in claim 1, wherein the first gas-flow passageway is provided with a main passageway that extends along the center axis of the main unit past the region opposite the liquid ejecting opening, and a buffer chamber that connects with passageway openings established in the main passageway at positions beyond the region opposite the liquid ejecting opening; and the liquid ejecting device is configured to supply first gas to the main passageway and deliver it through the passageway openings to the buffer chamber where it is flow-regulated.

7. The liquid ejecting device as cited in claim 1, wherein the liquid ejecting opening is opened as a straight-line slit and formed in a manner that allows fine particles sprayed from the liquid ejecting opening to move-out in a direction substantially perpendicular to the direction of the liquid-flow passageway inside the main unit.

8. The liquid ejecting device as cited in claim 1, wherein the liquid-flow passageway comprises a plurality of sub-passageways, and liquid supplied from each of the liquid-flow sub-passageways is merged together at the passageway stage prior to the liquid ejecting opening.

9. The liquid ejecting device as cited in claim 1, wherein the width of the liquid ejecting opening slit $d_3$ is made wider than the width of the first gas jet opening slit $d_1$ and wider than the width of the second gas jet opening $d_2$.

10. The liquid ejecting device as cited in claim 1, wherein the width of the liquid ejecting opening slit $d_3$ with respect to the width of the first gas jet opening slit $d_1$ and with respect to the width of the second gas jet opening $d_2$ is made such that:

$$d_3 \geq 1.5 d_1; \text{ or}$$

$$d_3 \geq 1.5 d_2.$$

11. The liquid ejecting device as cited in claim 1, wherein the inclined nozzle surfaces are configured to permit pressurized gas jets to break-up the liquid-flow sheet by cutting-away and fragmenting the liquid-flow sheet from both sides thereof.

12. The liquid ejecting device as cited in claim 1, wherein the gas jet openings comprises a first gas jet opening slit and a second gas jet opening slit, and wherein a width $d_1$ of the first gas jet opening slit is substantially uniform, and a width $d_2$ of the second gas jet opening is substantially uniform.

13. The liquid ejecting device as cited in claim 12, wherein the width $d_1$ of the first gas jet opening slit is equal to the width $d_2$ of the second gas jet opening.

14. The liquid ejecting device as cited in claim 12, wherein the liquid ejecting opening is a circular opening that is configured to discharge the liquid-flow sheet radially relative to the central axis of the main unit.

15. The liquid ejecting device as cited in claim 1, wherein the first inclined nozzle surface and the second inclined nozzle surface are approximately symmetric relative to the liquid ejecting opening.

16. A method of liquid ejection that uses pressurized gas including a first gas and a second gas to eject liquid as a spray of fine particles, the method comprising:

supplying liquid to a liquid-flow passageway housed in a cylindrical main unit;

forming the liquid supplied from the liquid-flow passageway into a liquid-flow sheet through a single slit-shaped liquid ejecting opening, which is confined to a plane at the end of the liquid-flow passageway, the liquid ejecting opening being established around the circumference of the cylindrical main unit to radiate fine particles outward in an annular pattern;

supplying the first gas via a first gas-flow passageway, which extends substantially parallel to the liquid-flow passageway, to a first gas jet opening on a first side of the plane including the liquid ejecting opening, wherein the first gas jet opening is confined to a surface at the end of the first gas-flow passageway;

supplying the second gas via a second gas-flow passageway, which extends substantially parallel to the liquid-flow passageway, to a second gas jet opening on a second side of the plane including the liquid ejecting opening, wherein the second gas jet opening is confined to a surface at the end of the second gas flow passageway, the first gas jet opening and the second gas jet opening being established along inclined nozzle surfaces that are established on opposite sides of the liquid ejecting opening;

forming the first gas into a first high-speed gas-flow and the second gas into a second high-speed gas-flow by adjusting an amount of flow in each of the first gas-flow passageway and the second gas-flow passageway so as to correspond to a spray pattern; and discharging the first high-speed gas-flow and the second high-speed gas-flow as surfaces that initially contact the liquid on the plane of the liquid-flow sheet, thereby atomizing the liquid-flow sheet into fine particles of liquid, wherein the inclined nozzle surfaces are configured so that the first and second high-speed gas-flows intersect radially outside of the main unit in the plane that includes the liquid ejecting opening, wherein the inclined nozzle surfaces protrude from the main unit and are partially exposed from the main unit, and wherein the liquid-flow plane is perpendicular to the central axis of the main unit.

17. The method of liquid ejection as cited in claim 16, wherein the first high-speed gas-flow and the second high-speed gas-flow intersect on the plane of the liquid-flow sheet to cut-away and fragment the liquid-flow sheet both sides thereof, thereby atomizing the liquid-flow sheet into fine particles of liquid.

* * * * *